United States Patent [19]

Nakamura

[11] Patent Number: 5,196,223

[45] Date of Patent: Mar. 23, 1993

[54] METHOD OF PRODUCING PIE DOUGH HAVING SLITS

[75] Inventor: Yasuhiro Nakamura, Utsunomiya, Japan

[73] Assignee: Rheon Automatic Machinery Co., Ltd., Utsunomiya, Japan

[21] Appl. No.: 814,351

[22] Filed: Dec. 27, 1991

[30] Foreign Application Priority Data

Jan. 11, 1991 [JP] Japan .................................. 3-12524

[51] Int. Cl.$^5$ .............................................. A23D 8/02
[52] U.S. Cl. ..................................... 426/503; 426/94; 426/502; 426/556; 426/560; 425/296; 425/305.1
[58] Field of Search ................. 426/94, 275, 502, 556, 426/560, 439, 503; 425/296, 297, 305.1

[56] References Cited

U.S. PATENT DOCUMENTS

| | | | |
|---|---|---|---|
| 4,517,203 | 5/1985 | Levine et al. | 426/502 |
| 4,618,498 | 10/1986 | Thulin | 426/502 |
| 4,907,501 | 3/1990 | Rijkaart | 426/502 |

Primary Examiner—Jeanette Hunter
Assistant Examiner—Helen Pratt
Attorney, Agent, or Firm—Guy W. Shoup; Patrick T. Bever

[57] ABSTRACT

The method of producing pie dough by stretching a pie dough sheet, laminating the dough sheet by alternately folding it in two opposite directions normal to its traveling direction, stretching the laminated dough sheet, and, if necessary, repeating the laminating and stretching processes. The degree of stretching in the lateral direction of the dough sheet is adjusted to be higher than that in the lengthwise direction and the staggered slits are formed in the dough sheet in the traveling direction of the sheet so that when the pie dough is thereafter baked, fillings therein can be seen through the openings of the slits.

3 Claims, 7 Drawing Sheets

FIG. 9

METHOD OF PRODUCING PIE DOUGH HAVING SLITS

FIELD OF THE INVENTION

This invention relates to a method of producing pie dough. More particularly, it relates to a method of forming a net-like pattern on the upper surface of a strudel, i.e., a kind of pie, without resorting to any manual operation.

PRIOR ART

Figure 1:
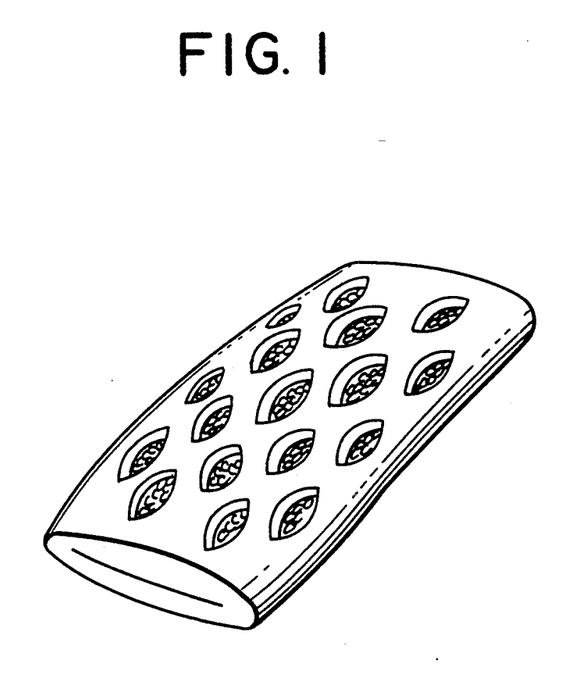
FIG. 1 is a sketch of a strudel formed by the method of this invention.

A net-patterned strudel is a food product, the upper surface of which has slits in a net-like pattern as shown in FIG. 1. It exposes its fillings through the openings of the slits to stimulate one's appetite.

Figure 8:
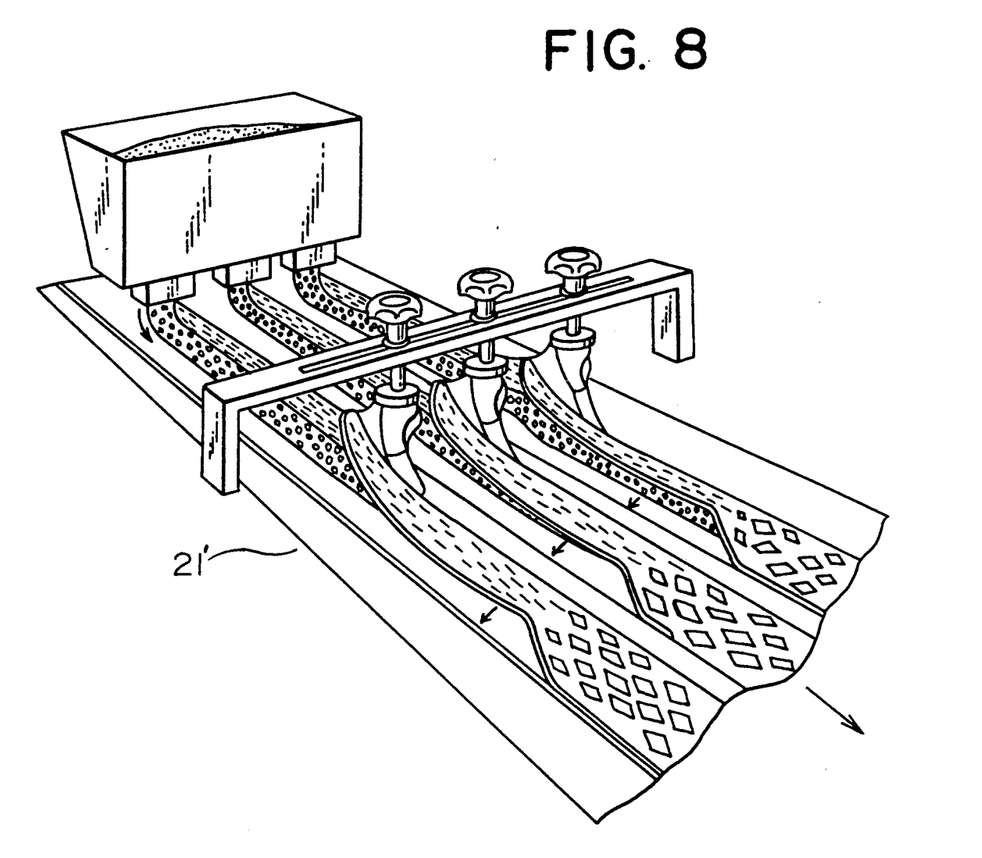
FIG. 8 is a schematic perspective view of the folding means used in the method of the prior art.

In the continuous production of strudels by a prior art method, slits of a predetermined pattern are made in the upper part of the dough coating. A patterned dough sheet is laid over a second dough sheet, which carries a filling thereon. The laminated dough is manually stretched in the lateral direction to open the slits (FIG. 8).

However, this manual stretching needs significant amounts of labor and time. Especially, in mass production it causes a heavy burden.

SUMMARY OF THE INVENTION

This invention aims to eliminate the above-mentioned drawbacks to such prior art processes for producing strudels.

It is an object of this invention to provide a method of controlling the degree of stretching pie dough in both the lateral and lengthwise directions thereof.

It is another object of this invention to provide an effective method of automatically opening slits made in the upper part of strudels.

It is a further object of this invention to provide a hygienic method of automatically producing neatly patterned strudels.

In one aspect of this invention, a method of producing pie dough is provided wherein the method consists of stretching a dough sheet, laminating the dough sheet by alternately folding it in two opposite directions normal to its traveling direction, stretching the laminated dough sheet, and, if necessary, repeating the laminating and stretching processes. The degree of the stretching of the finally stretched and formed dough sheet in each of the lateral and lengthwise directions of the dough sheet is differentiated so that, when a pie is formed and baked, the slits are opened of themselves.

In another aspect of this invention, a method of producing pie dough is provided wherein the method consists of stretching a dough sheet, laminating the dough sheet by alternately folding it in two opposite directions normal to its traveling direction, stretching the laminated dough sheet, and, if necessary, repeating the laminating and stretching processes, so that the degree of stretching in the lateral direction of the sheet dough is adjusted to be higher than that in the lengthwise direction. Further, the staggered slits are formed in the dough sheet along its traveling direction so that when the pie dough is thereafter wound around fillings, cut and baked, the slits are open in the lateral direction and fillings therein can be seen through the openings of the slits.

DESCRIPTION OF THE PREFERRED EMBODIMENT

Figure 2:
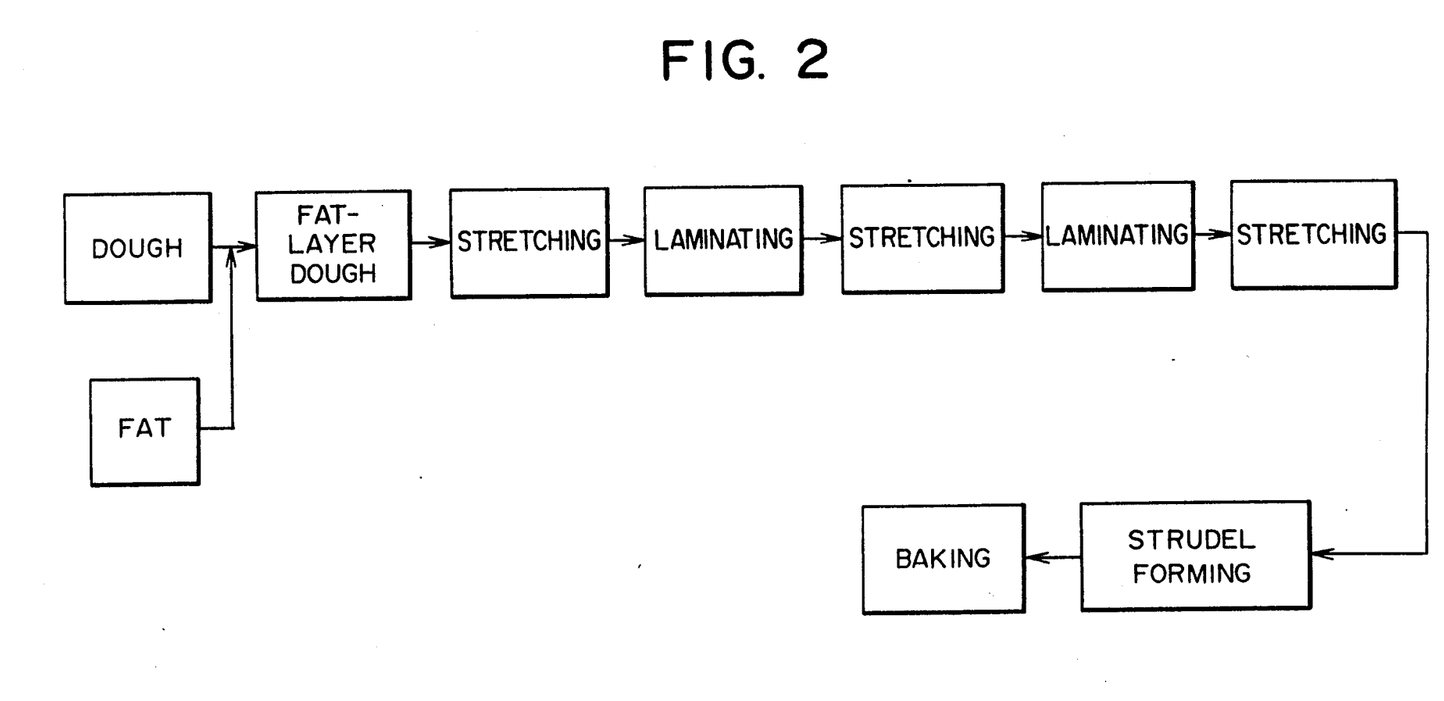
FIG. 2 is a block diagram of a process for producing the strudel.

FIG. 2 shows the process of producing pie dough according to an embodiment of this invention. This process is carried out by the apparatus shown in FIG. 3.

Figure 3:
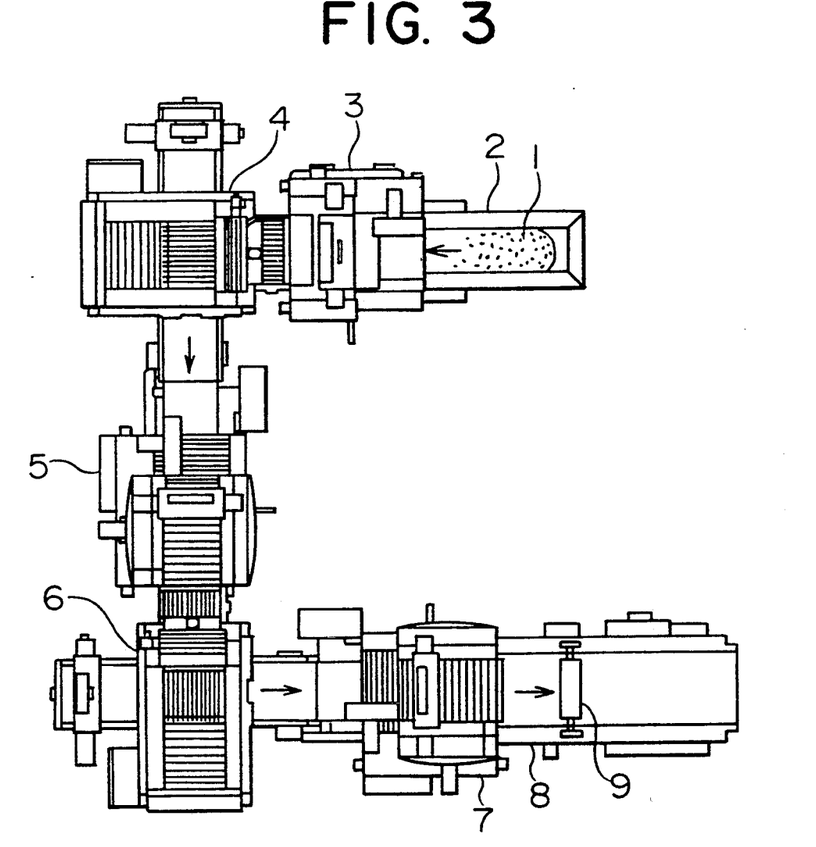
FIG. 3 is a top view of the means used in an embodiment of the method of this invention.

In FIG. 3, a fat-layered dough sheet 1 is provided on a feed conveyor 2. The fat-layered dough sheet is produced by fat being inserted between laminated layers of dough to form at least one layer of fat in between.

A first stretching means 3 is disposed downstream of and adjacent to the feed conveyor 2. The stretching means 3 receives the dough sheet from the feed conveyor 2 and stretches it.

A first laminating means 4 is disposed downstream of and adjacent to the first stretching means 3. The laminating means 4 receives the stretched dough sheet and laminates it. The traveling direction of the dough sheet is changed by 90 degrees at the first laminating means 4 when the lamination is carried out. The first laminating means 4 is in turn connected to a second stretching means 5, where the laminated dough sheet is subjected to stretching.

A second laminating means 6 is disposed downstream of the second stretching means 5 to laminate the dough sheet from the second stretching means 5. The traveling direction of the dough is again changed by 90 degrees at the second laminating means 6 when the second lamination is carried out. The second laminating means 6 is, in turn, connected to a third stretching means 7, where the dough sheet is further stretched.

A forming conveyor 8 is disposed downstream of the third stretching means 7. The dough sheet is formed into pie dough pieces while on this conveyor. A cutter 9 for forming slits in the dough at staggered positions is provided over the forming conveyor 8.

Figure 4:
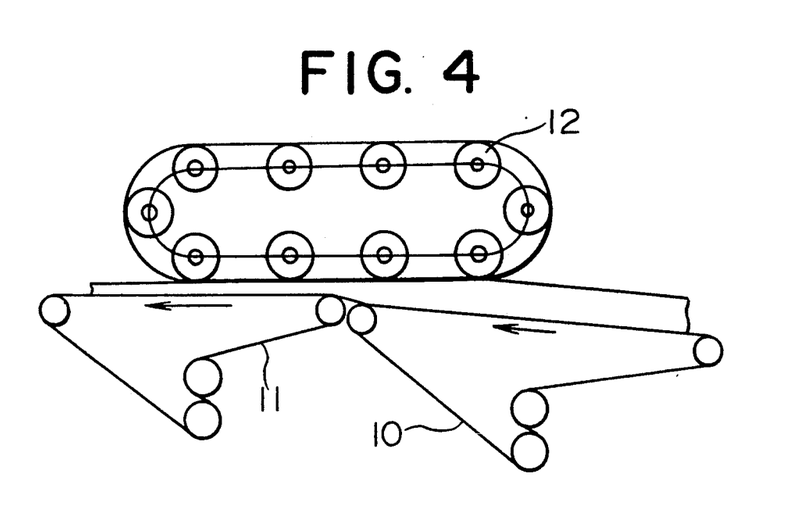
FIG. 4 is a schematic side view of an embodiment of the stretching means used in the method of this invention.

An example of the stretching means 3, 5, 7 of a known type used in an embodiment of this invention is shown in FIG. 4. The stretching means 3, 5, 7 consists of a plurality of rollers 12 that move along an elliptical track while rotating on their axes.

The stretching means 3, 5, 7 is provided with a pair of conveyors 10, 11 thereunder. The conveyors 10, 11 are disposed in series in the traveling direction of the dough such that the downstream conveyor 11 runs faster than the upstream one 10.

A plurality of rollers 12, which are driven by a conventional driving mechanism (not shown), are disposed above the conveyors 10, 11. The rollers 12 are adapted to rollingly move downstream along a straight line formed between the facing rollers 12 and the conveyors 10, 11 while keeping a predetermined distance therebetween. Thereby the dough passing therethrough is stretched.

Figure 5:
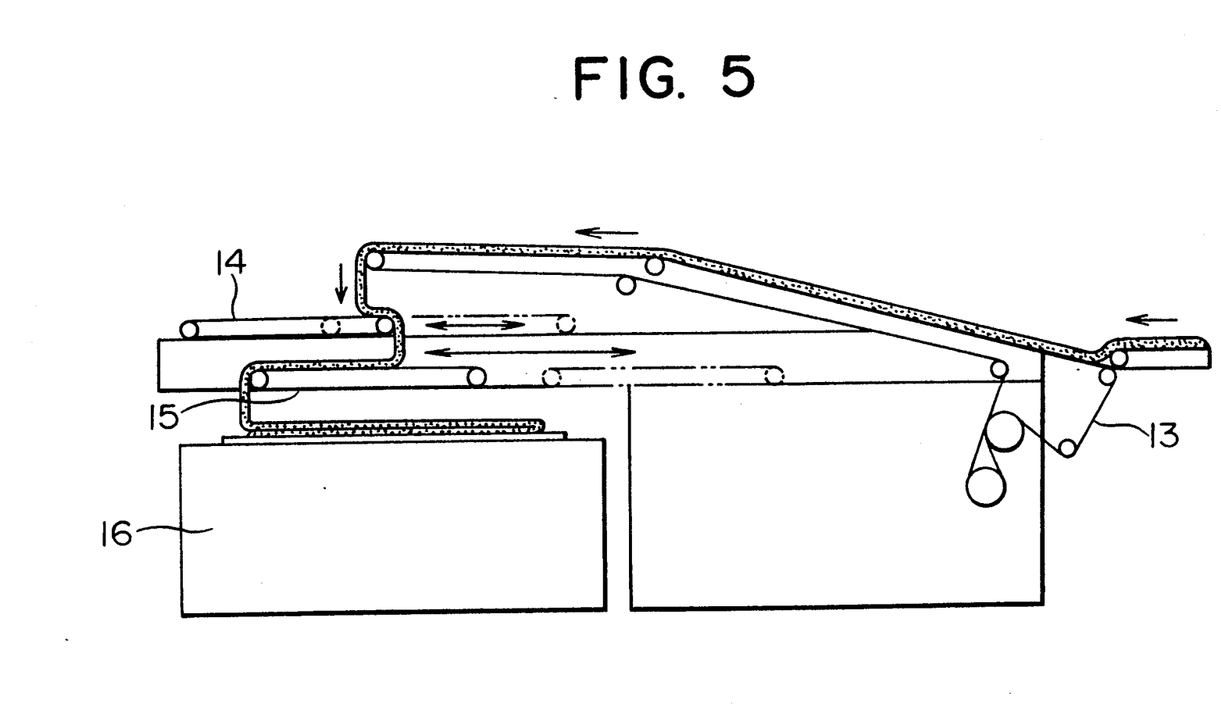
FIG. 5 is a side elevation view of one embodiment of the laminating means in the method of this invention.
Figure 6:
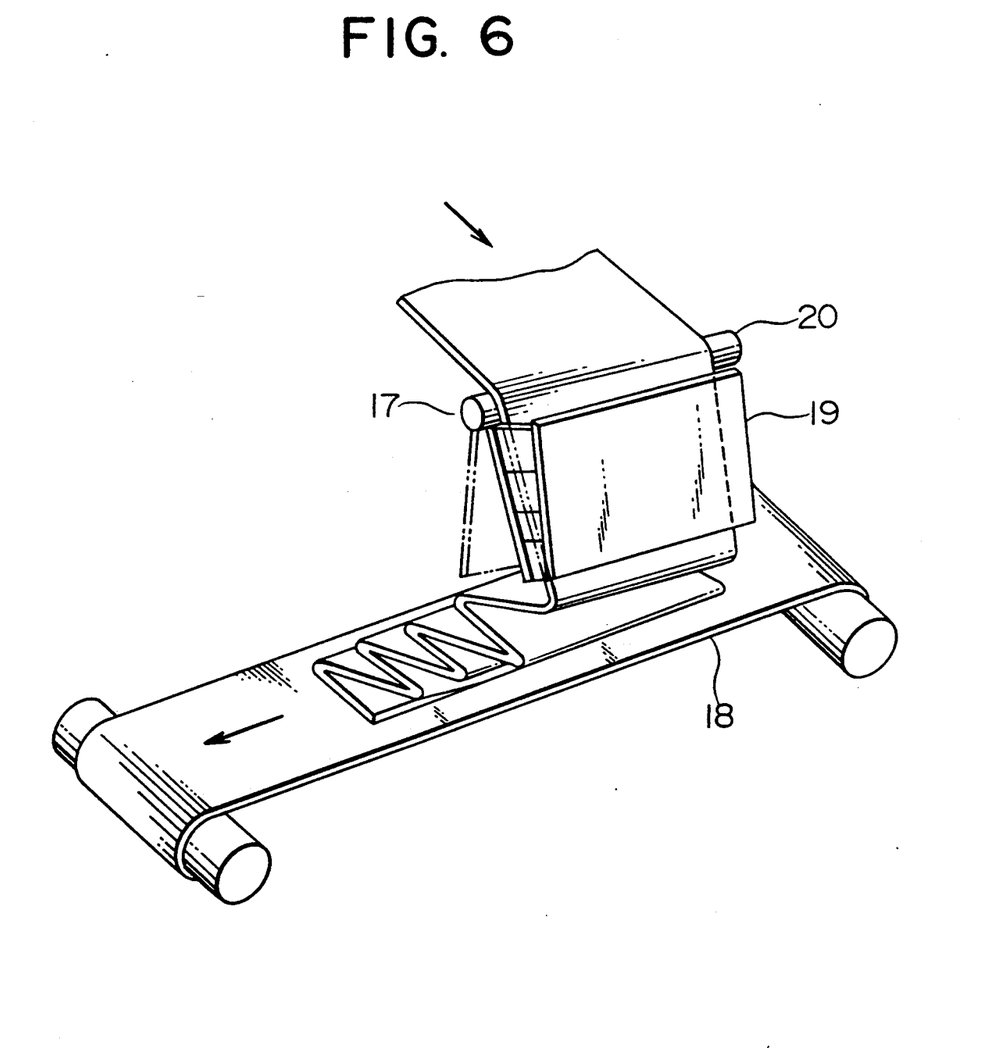
FIG. 6 is a perspective view of another embodiment of laminating means in the method of this invention.

FIGS. 5 and 6 illustrate embodiments of the laminating means 4 and 6 in the method of this invention. FIG. 5 shows a conventional laminating means, a so-called parallel piler, consisting of three conveyors 13, 14, 15, which cooperate to continuously laminate the dough. The first conveyor 13 continuously feeds the dough sheet onto the second conveyor 14. The second conveyor 14, positioned beneath the first conveyor 13, reciprocates to feed the dough sheet in the reverse direction, and, when it retracts, it causes the dough sheet to fall onto the third conveyor 15 positioned beneath the second conveyor 14 and adapted to reciprocate such that it moves in directions reverse to the movement of the second conveyor 14. These conveyors move the dough sheet slidingly back and forth, place the dough sheet on a conveyor 16, and thereby complete the lamination of the dough sheet. The laminated dough is accumulated on a continuously moving conveyor 16 placed at right angles to the conveyors 13, 14, and 15, and thus the traveling direction of the laminated dough sheet is changed by 90 degrees.

FIG. 6 shows a laminating means used in another embodiment of this invention. It consists of a swinging mechanism 17 and a conveyor 18. The swinging mechanism 17 consists of a pair of swinging plates 19 and a swinging shaft 20 on which the swinging plates are pivotally supported. The dough sheet is fed between the two swinging plates 19 and guided by them to fall onto the conveyor 18. The dough sheet is laminated by the swinging movements of the swinging plates 19 while it is downwardly passed between the swinging plates 19.

The operation of forming a strudel dough sheet in an embodiment of this invention will now be explained.

A prepared strip of fat-layered dough 1 is fed through the feeding conveyor 2 onto the first stretching means 3. The dough sheet 1 is rollingly stretched at the first stretching means 3 into a thin sheet of dough. The stretched dough sheet is laminated in layers by being repeatedly folded by the first laminating means 4. The traveling direction of the laminated dough sheet is changed by 90 degrees at the first laminating means 4, and then transferred to the second stretching means 5 to be stretched in that direction. These laminating and stretching processes are repeated through the second laminating means 6 and the third stretching means 7.

In a test carried out using the process of this invention, a dough sheet was laminated respectively in four and 24 layers at the first and second laminating means 4 and 6. The dough sheet was 24 mm thick before entering the third stretching means 7. It was stretched to 4 mm in thickness, namely, stretched by six times.

Thus, the dough transported onto the forming conveyor 8 was stretched in the traveling direction by 12 times (this is a product of multiplying the numbers of the stretching at the first and the third stretching means), and in the lateral direction by 15 times at the second stretching means 5. As a result, the degree of stretching in the lateral direction is larger than that in the lengthwise direction.

Figure 7:
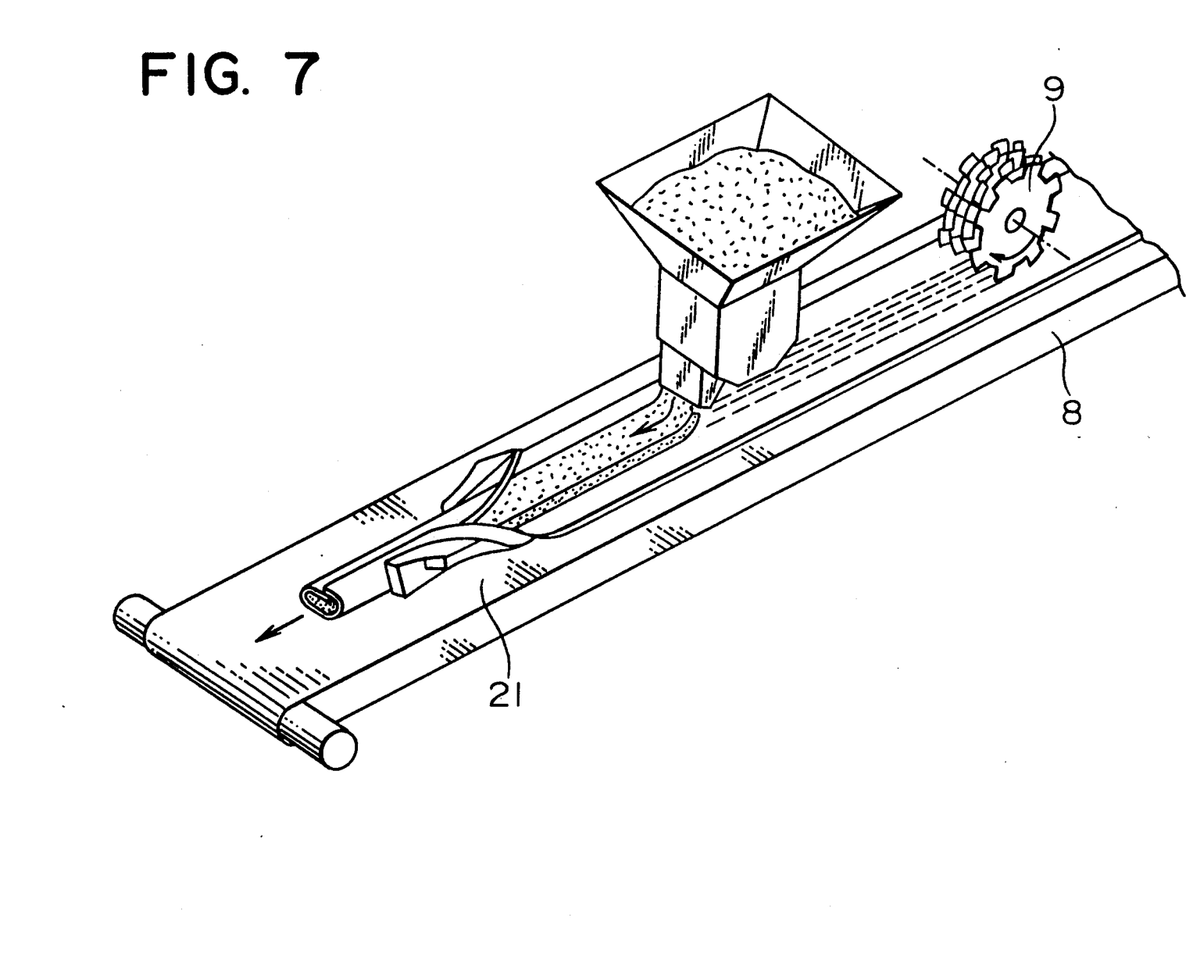
FIG. 7 is a schematic perspective view of the cutting and folding means used in an embodiment of the method of this invention.

As shown in FIG. 7, slits are provided in the dough by the cutter 9 disposed downstream of the third stretching means 7 and above the forming conveyor 8. The filling is poured from a hopper positioned downstream of the cutter 9 and above the forming conveyor 8, and placed on the dough sheet in a continuous form. The edges of the slit dough sheet are folded back by a conventional folding means 21. It consists of a pair of stem-shaped guide members alternately positioned on both sides of the dough sheet. When the dough sheet is passed between them the edges of the dough sheet are folded back to enclose the filling. In this case, since the slits are provided in the lower-side surface, the dough sheet is turned over to form strudel products after being cut off into pieces of a predetermined length. The slits are opened up to form a net-like pattern after being baked.

Figure 9:
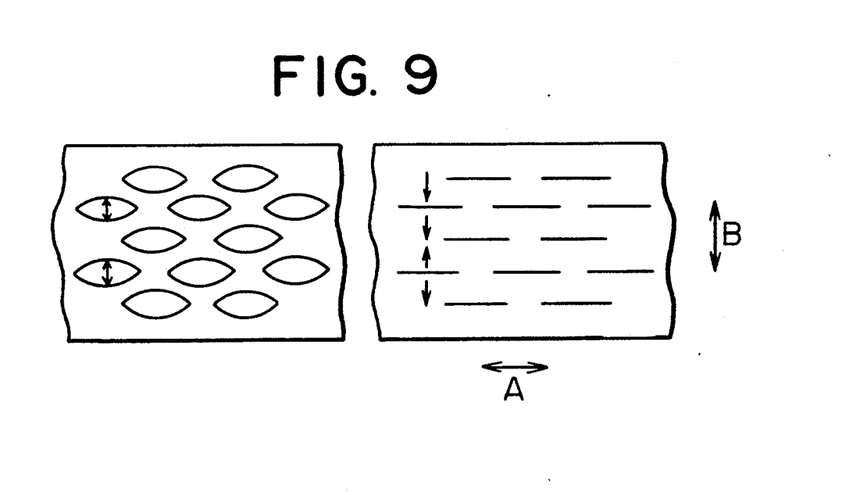
FIG. 9 is a schematic view illustrating the mechanism that forms the net-like patterns of the strudels by the method of this invention.

As shown in FIG. 9, the strudel dough sheet has a larger degree of stretching in the lateral direction B than in the lengthwise direction A. Thus the internal stress becomes higher in the lateral direction B than the other direction A, so if the slits are cut in the traveling direction, the internal stress in the lateral direction B is concentrated on the slit-free blank parts. Therefore, when the strudel product is baked, the slits are widened in the lateral direction B, thereby forming a net-like pattern (FIG. 1).

Although fat-layered dough is used in the above-mentioned embodiment of this invention, dough kneaded with fat, without forming any layers, also yields the same effect as the fat-layered dough.

In a prior art means shown in FIG. 8, a conventional folding means 21' is used for one side of the strudel product. The folding means 21' is substantially the same as the folding means 21 shown in FIG. 7 except that the former is adapted to fold only one side of the dough sheet. The width of the dough sheet whose slits are formed and which is turned over the filling barely covers the filling, and thus this dough sheet is subsequently manually stretched to make its end meet the end of the lower part of the dough sheet, whereby the slits are widened to form a net pattern. However, if the pie dough of this invention is used and if the folding is arranged so that the end of the upper part of the dough sheet meets the end of its lower part, a satisfactory net-patterned pie will be obtained after baking even if the conventional folding means 21' is used. An increase in the amount of folds of dough provided through the one-side folding means 21' may eliminate a manual operation when the sheet dough prepared by this invention is used.

The effects of the Invention

As is explained above, by changing the degree of stretching in each of the lateral and lengthwise directions of the dough sheet by carrying out laminating and stretching steps, the method of this invention can automatically form a net-like pattern after the filled pie dough is baked without using any manual operation. Hence, the efficiency in continuously producing hygienic strudel products with neatly formed net-like patterns thereon is greatly improved.

We claim:

1. A method of producing a pie dough sheet comprising the steps of stretching a dough sheet, laminating the dough sheet by alternately folding it in two opposite directions normal to its traveling direction, stretching the laminated dough sheet, and, if necessary, repeating the laminating and stretching processes, wherein the degree of stretching of the finally stretched dough sheet in the lateral direction is different from the degree of stretching in the lengthwise direction of the dough sheet, said method including making slits in the stretched dough sheet in a direction normal to the direction in which the dough sheet has a higher degree of stretching.

2. The method of claim 1 wherein the slits are formed in staggered positions.

3. A method of producing pie dough comprising the steps of stretching a dough sheet, laminating the dough sheet by alternately folding it in two opposite directions normal to its traveling direction, stretching the laminated dough sheet, and, if necessary, repeating the laminating and stretching processes, wherein the degree of stretching in the lateral direction of the dough sheet is higher than in the lengthwise direction of the dough sheet and wherein staggered slits are formed in the dough sheet in the traveling direction of the dough sheet so that when the pie dough is thereafter wound around fillings, cut and baked, the staggered slits are opened due to the difference in the degrees of stretching so that fillings therein can be seen through the openings of the staggered slits. n

* * * * *